United States Patent
Yamamoto et al.

(10) Patent No.: US 6,784,917 B1
(45) Date of Patent: Aug. 31, 2004

(54) DIGITAL BROADCASTING SYSTEM

(75) Inventors: Yuji Yamamoto, Yawata (JP); Yukio Mori, Kadoma (JP)

(73) Assignees: Sanyo Electric Co., Ltd., Osaka (JP); Nippon Television Network Corporation, Tokyo (JP)

( * ) Notice: Subject to any disclaimer, the term of this patent is extended or adjusted under 35 U.S.C. 154(b) by 0 days.

(21) Appl. No.: 09/308,229

(22) PCT Filed: Dec. 3, 1997

(86) PCT No.: PCT/JP97/04409

§ 371 (c)(1),
(2), (4) Date: May 20, 1999

(87) PCT Pub. No.: WO98/25406

PCT Pub. Date: Jun. 11, 1998

(30) Foreign Application Priority Data

Dec. 6, 1996 (JP) .............................. 8-326721

(51) Int. Cl.[7] .............................................. H04N 13/00
(52) U.S. Cl. ........................................................ 348/43
(58) Field of Search .............................. 348/42, 43, 47, 348/441, 446, 448; H04N 13/00

(56) References Cited

U.S. PATENT DOCUMENTS

| | | | |
|---|---|---|---|
| 4,027,333 A | | 5/1977 | Kaiser et al. |
| 4,562,463 A | * | 12/1985 | Lipton .......................... 348/56 |
| 4,885,787 A | * | 12/1989 | Okamoto et al. ........... 382/260 |
| 5,142,357 A | * | 8/1992 | Lipton et al. .................. 348/48 |
| 5,351,082 A | * | 9/1994 | Kasagi ......................... 348/294 |
| 5,633,682 A | | 5/1997 | Tahara |
| 6,008,839 A | * | 12/1999 | Nagele et al. ................. 348/47 |

FOREIGN PATENT DOCUMENTS

| | | |
|---|---|---|
| JP | 52-82015 | 7/1977 |
| JP | 59-28789 | 2/1984 |
| JP | 59-500298 | 2/1984 |
| JP | 61-177889 | 8/1986 |
| JP | 2-172396 | 7/1990 |
| JP | 5-227516 | 9/1993 |
| JP | 7-30923 | 1/1995 |
| JP | 7-123447 | 5/1995 |
| JP | 08-070475 | 3/1996 |
| JP | 8-307905 | 11/1996 |
| JP | 9-163408 | 6/1997 |
| WO | WO98/25406 | 6/1998 |

OTHER PUBLICATIONS

"Development of CS Digital Broadcasting System Prototype for 525–Progressive Scanning Signal," ITE Technical Report, vol. 20, No. 13, pp. 25–30, Feb. 1996.

"A Study on Applying MPEG–2 Video Coding for Stereo Motion Pictures," Information Technology Research Laboratories, NEC Corporation, Satoshi Nogaki, pp. 43–44, Oct. 17, 1994.

"Technical Characteristics and Relative Position of Progressive Scanning," Tadahiko Fukinuki, 1996, vol. 49, No. 8.

International Publication No. WO 83/02706, published Aug. 4, 1983.

\* cited by examiner

*Primary Examiner*—Nhon Diep
(74) *Attorney, Agent, or Firm*—Arent Fox PLLC

(57) ABSTRACT

A digital broadcasting system is obtained having simple facilities and circuit structure and capable of efficiently transmitting and receiving synchronized pictures and displaying them without applying a synchronizing process thereto.

According to the digital broadcasting system, picture signals respectively for the light eye and the left eye obtained from two synchronously operated cameras (13a, 13b) are converted to a noninterlace frame signal (picture data) by a frame memory unit (20) of the transmitting end. The picture data is compressed and modulated, and then transmitted to a communication satellite (8) over a transmission line of one channel. A transmission signal supplied from the communication satellite (8) is demodulated and decoded, and then converted to picture signals for the right and left eyes by a frame memory unit (21) of the receiving end, and the converted signals are displayed on a stereoscopic display monitor (12) in a stereoscopic manner.

2 Claims, 7 Drawing Sheets

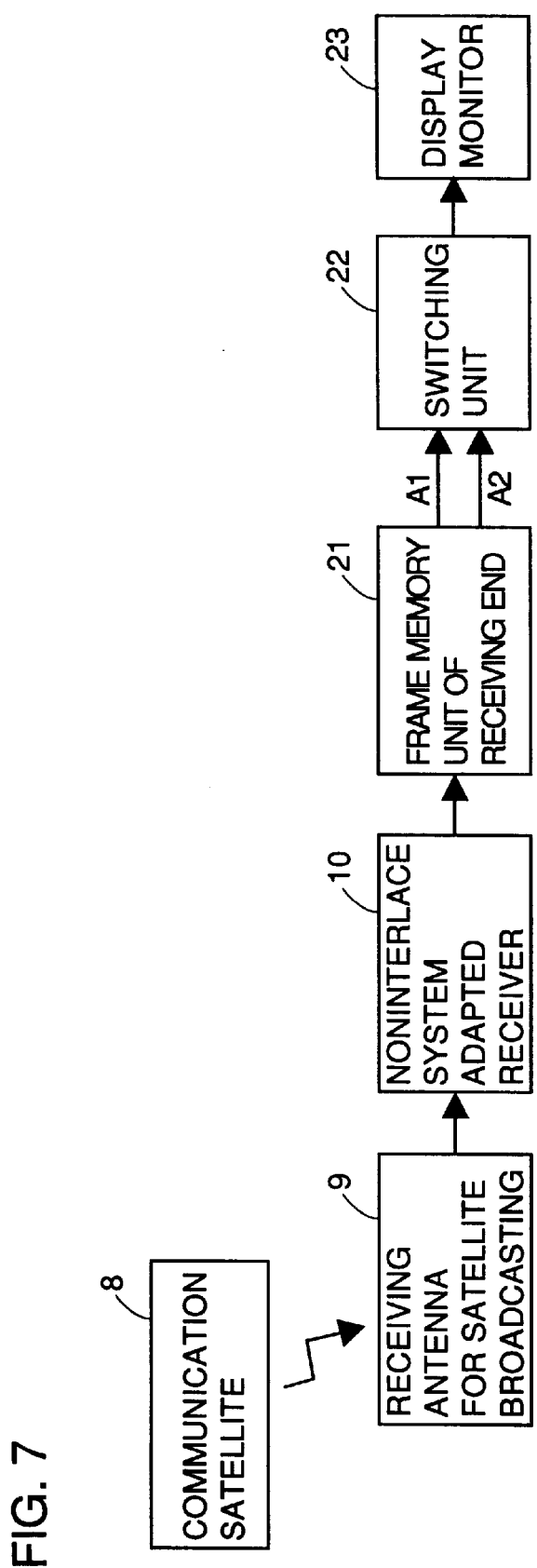

DIGITAL BROADCASTING SYSTEM

TECHNICAL FIELD

The present invention relates to a digital broadcasting system, particularly to a digital broadcasting system having a compression processing circuit for transmitting and receiving a plurality of pictures.

BACKGROUND ART

A conventional system used for providing a broadcasting service regarding video pictures transmits the pictures over a transmission line of a single channel picture by picture, receives the transmitted pictures at a tuner picture by picture, and selects any picture to be displayed.

In other words, the conventional broadcasting system mentioned above requires a transmission line of a single channel for each picture in order to simultaneously transmit a plurality of pictures.

In order to provide simultaneous transmission of two different pictures, for example, transmission lines of two channels are necessary, leading to a problem that the transmission lines occupy twice the band required for transmission of one picture.

On the other hand, the receiving end requires two tuners for receiving these different pictures.

Further, if the pictures are synchronized with each other, the receiving end needs to carry out a process for synchronizing the pictures that are separately received.

A resultant problem is that the broadcasting service to be implemented for simultaneously providing two synchronized pictures has its facilities and circuit structure that are significantly complicate and large-scale, compared with the ordinary broadcasting service.

Accordingly, the present invention aims to provide a digital broadcasting system capable of efficiently transmitting and receiving pictures of two channels.

The invention further aims to provide a digital broadcasting system which does not need a synchronizing process when synchronized pictures of two channels are transmitted and received.

The invention still further aims to provide a digital broadcasting system capable of achieving those aims with simple facilities and circuit structure.

DISCLOSURE OF THE INVENTION

According to the invention, a digital broadcasting system includes a picture processing circuit generating picture data of one channel using a first picture signal and a second picture signal, a transmission circuit compressing and modulating the picture data and then transmitting the picture data, a reception circuit receiving the transmitted picture data, and demodulating and expanding the picture data, and a picture reproducing circuit receiving the demodulated and expanded picture data to reproduce the first and second picture signals.

An advantage of the invention thus resides in efficient transmission and reception of two picture data over a transmission line of one channel.

BRIEF DESCRIPTION OF THE DRAWINGS

FIG. 7 is a schematic block diagram illustrating a structure of the receiving end of the digital broadcasting system in the second embodiment.

BEST MODES FOR CARRYING OUT THE INVENTION

First Embodiment

The present invention enables pictures of two channels to be transmitted and received over a transmission line of one channel by generating a noninterlace frame signal of one channel (frame) from pictures of two channels (fields) taken according to the current interlace system (NTSC) in the digital broadcasting system.

The embodiments presented below are described in relation to a stereoscopic broadcasting service requiring pictures for the right and left eyes respectively, that is implemented by employing as an example of the digital broadcasting system the one according to the 525 progressive scanning system (hereinafter referred to as a noninterlace digital broadcasting system) which is expected to be in increasing demand in the future.

Details of such a noninterlace digital broadcasting system are found in, for example, "Development of CS Digital Broadcasting System Prototype for 525-Progressive Scanning Signal" by Urano et al in Technical Report of the Institute of Television Engineers of Japan, Vol. 20, No. 13, pp. 25–30 published on Feb. 27, 1996.

Figure 1:
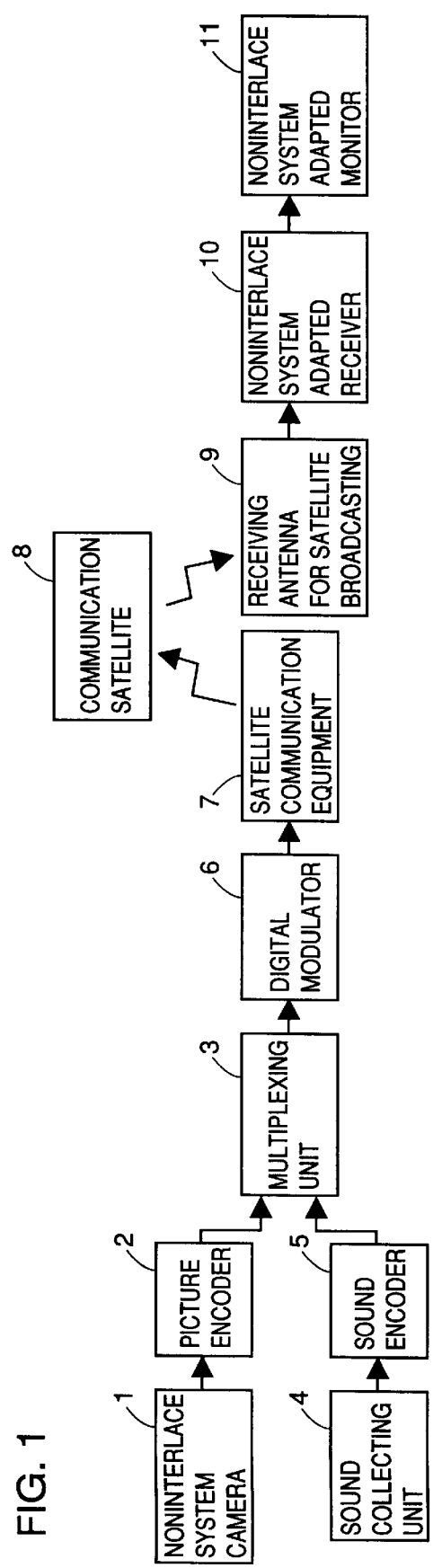
FIG. 1 is a schematic block diagram illustrating an entire structure of an ordinary digital broadcasting system.

FIG. 1 is a schematic block diagram illustrating for reference an example of a basic structure of such a noninterlace digital broadcasting system. The illustrated system uses a communication satellite as an example of the transmission system. The detailed specifications of each component described below are given by the above document and accordingly, the details are not herein described.

Referring first to FIG. 1, the transmitting end in the noninterlace digital broadcasting system includes a noninterlace system camera 1, a picture encoder 2, a sound collecting unit 4, a sound encoder 5 and a multiplexing unit 3.

Picture encoder 2 receives a picture signal obtained from a picture taken by noninterlace system camera 1 and encodes (compresses) it.

In the compression process, the picture signal is converted to a collection of pixel data (hereinafter referred to as block) produced by dividing the picture signal into the pixel data consisting of BX data in the horizontal direction and BY data in the vertical direction, and correlates them relative to each block and relative to blocks at the same position in the preceding and following picture signals.

Such a compression process is represented by the international standard MPEG2 defined by the cooperative work group of MPEG (Moving Picture Expert Group) consisting of CCITT and ISO.

Sound encoder 5 encodes (compresses) a sound signal obtained by sound collecting unit 4.

Multiplexing unit 3 applies transmission line coding to the compressed picture signal and sound signal, multiplexes and outputs them.

A digital modulator 6 digitally modulates the multiplexed signal supplied from multiplexing unit 3 to output it to a satellite communication equipment 7. Satellite communication equipment 7 transmits the signal to a communication satellite 8.

Referring again to FIG. 1, a system of the receiving end includes a receiving antenna for satellite broadcasting 9, a noninterlace system adapted receiver 10, and a noninterlace system adapted monitor 11.

Receiving antenna for satellite broadcasting 9 receives a transmission signal from communication satellite 8.

Noninterlace system adapted receiver 10 demodulates the transmission signal received by satellite broadcast receiving antenna 9 and decodes (expands) it based on MPEG2.

Noninterlace system adapted monitor 11 displays an output from noninterlace system adapted receiver 10.

Figure 2:
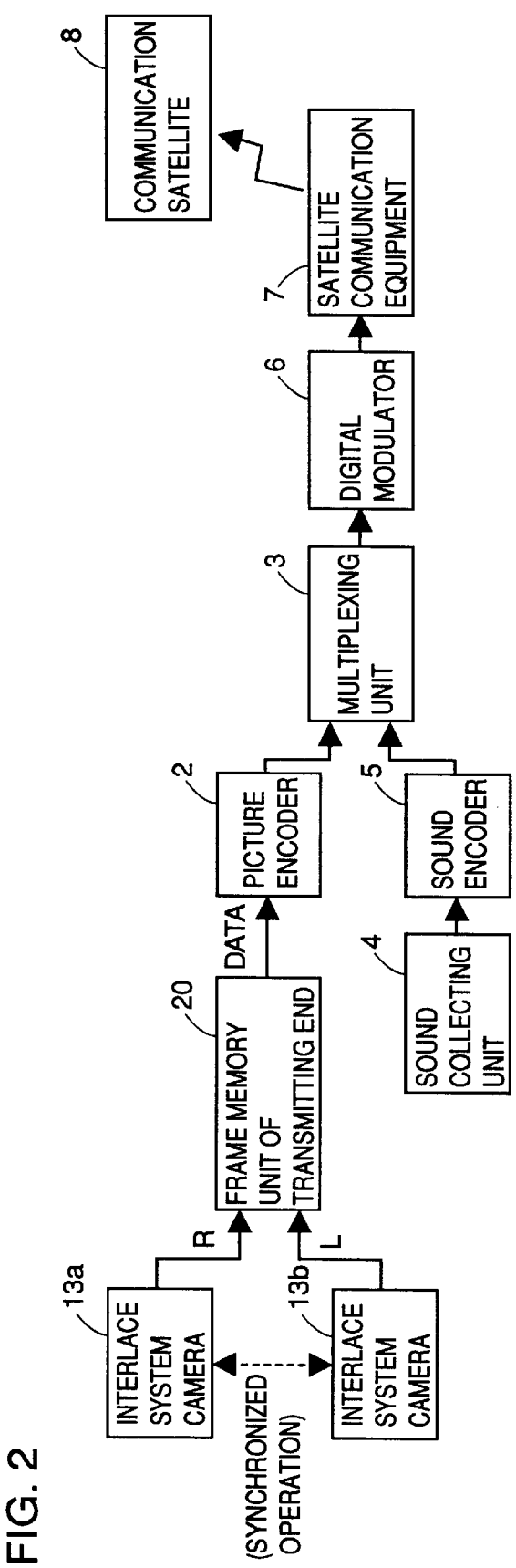
FIG. 2 is a schematic block diagram illustrating a structure of the transmitting end of a digital broadcasting system in the first embodiment.

FIG. 2 is a schematic block diagram illustrating a basic structure of the transmitting end of a digital broadcasting system according to the first embodiment of the invention that can provide the stereoscopic broadcasting service by employing the noninterlace digital broadcasting system described above. The components common to the structure of FIG. 2 and the ordinary digital broadcasting system already shown in FIG. 1 are referred to by the same reference numerals and characters, and description thereof is not repeated here.

A system structure of the transmitting end of the noninterlace digital broadcasting system in the first embodiment of the invention and its operation are first described.

Referring to FIG. 2, the transmitting end of the noninterlace digital broadcasting system in the first embodiment of the invention employs interlace system cameras 13a and 13b as input devices for pictures.

The two interlace system cameras 13a and 13b are operated in synchronization with each other for taking a stereoscopic picture. A picture signal R for the right eye is supplied from interlace system camera 13a and a picture signal L for the left eye is supplied from interlace system camera 13b.

A frame memory unit 20 of the transmitting end receives at its input the picture signal R for the right eye and the picture signal L for the left eye obtained by interlace system cameras 13a and 13b respectively.

Frame memory unit 20 of the transmitting end writes the picture signal R for the right eye into one of two field memories (not shown) of the transmitting end and writes the picture signal L for the left eye into the other field memory. Frame memory unit 20 then reads field data (the written right eye picture signal R and left eye picture signal L) from respective field memories of the transmitting end at a rate twice the writing frequency.

The signals are read in the order, for example, that the right eye picture signal R (or the left eye picture signal L) corresponding to one field is first read from one field memory of the transmitting end, and next the left eye picture signal L (or the right eye picture signal R) corresponding to one field is read from the other field memory of the transmitting end.

The number of effective pixels of an interlace field signal (picture signal R for the light eye and picture signal L for the left eye), horizontal sync frequency FH, and vertical sync frequency FR are defined here for a specific description below, for example, as 704 pixels in the horizontal direction×240 pixels in the vertical direction, about 15.75 kHz (15.75/1.001 kHz), and about 60 Hz (60/1.001 Hz) respectively.

Specifically, the writing frequency and the reading frequency are defined as FH and (2×FH) respectively.

According to the format of picture data DATA obtained by the reading process, the number of effective pixels is 704 in the horizontal direction×480 in the vertical direction, the horizontal sync frequency is approximately 31.5 kHz (31.5/1.001 kHz), and the vertical sync frequency is approximately 60 Hz (60/1.001 Hz). This format corresponds to the format of a standard noninterlace frame signal.

Figure 3A:
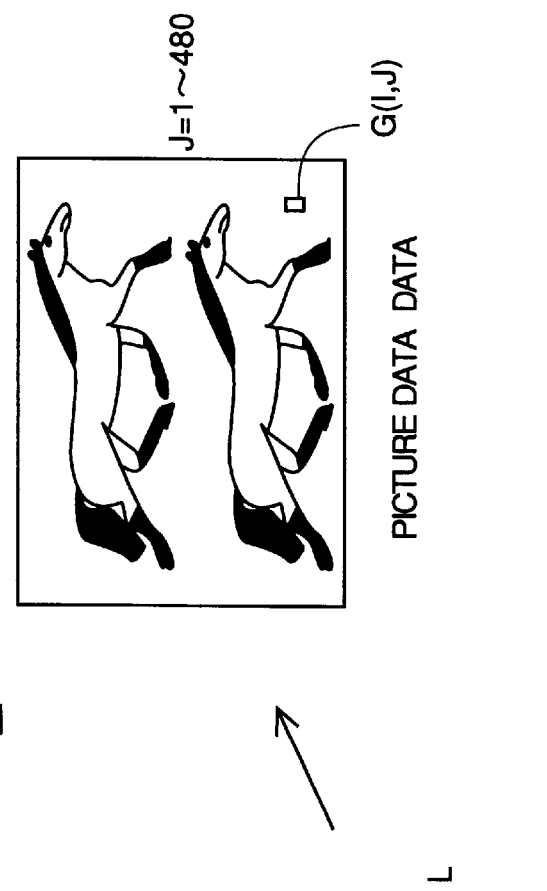
FIGS. 3A to 3C illustrate the processing of a frame memory unit of the transmitting end in the first embodiment.
Figure 3B:
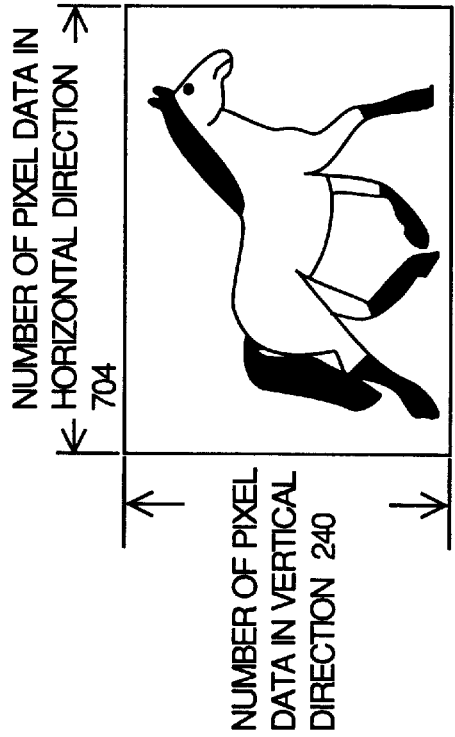
Figure 3C:
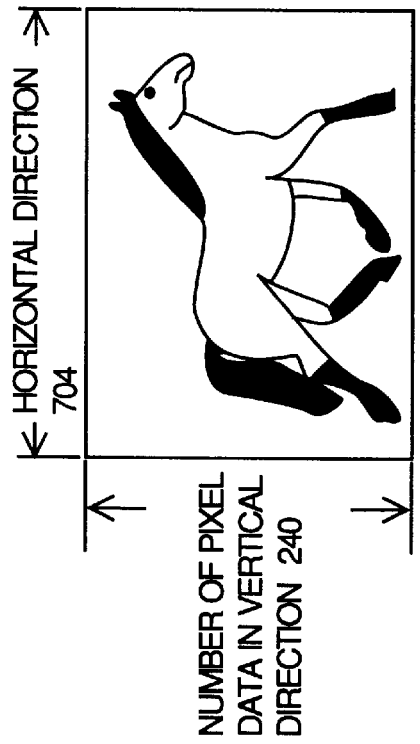

FIG. 3 illustrates the processing of frame memory unit 20 of the transmitting end in the first embodiment of the invention, with FIG. 3A showing a structure of picture data DATA, FIG. 3B showing a structure of picture signal R for the right eye, and FIG. 3C showing a structure of picture signal L for the left eye.

In FIG. 3A, pixel data G (I, J) represents pixel data corresponding to the horizontal number I (I=1–704) and the vertical number J (J=1–480) constituting picture data DATA.

The region of the matrix formed of pixel data G (I, J) corresponding to I=1–704 and J=1–240 (referred to simply as a first region) is formed of picture signal R for the right eye, and the region corresponding to I=1–704 and J=241–480 (refereed to as a second region) is formed of picture signal L for the left eye.

As clearly shown in FIGS. 3A to 3C, frame memory unit 20 of the transmitting end converts interlace field signals of two fields (right eye picture signal R and left eye picture signal L) to a noninterlace frame signal of one frame (picture data DATA).

Further, the interlace field signals constituting picture data DATA each maintain its original structure as a single signal, as clearly shown in FIGS. 3A to 3C.

When picture data DATA is compressed, picture signal R for the right eye and picture signal L for the left eye are simultaneously compressed. Accordingly, picture data DATA supplied from field memory unit 20 of the transmitting end is efficiently compressed in picture encoder 2.

It is noted that the same effect is achieved even if left eye picture signal L is arranged in the first region and right eye picture signal R is arranged in the second region.

Each circuit following picture encoder 2 operates as described in relation to FIG. 1.

Consequently, a noninterlace frame signal (picture data DATA) of one frame formed of picture signals of two fields is transmitted to communication satellite 8 over a transmission line of a single channel.

A system structure of the receiving end of the noninterlace digital broadcasting system in the first embodiment of the invention and its operation are next described.

Figure 4:
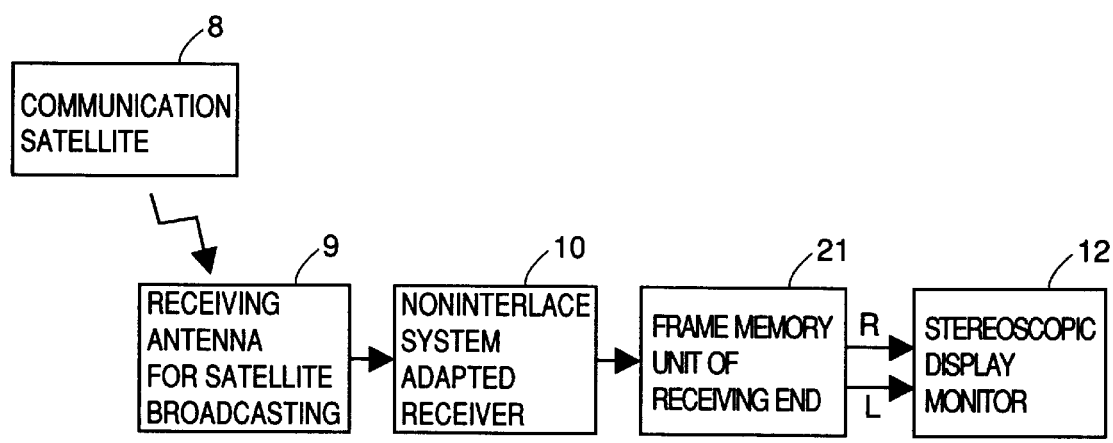
FIG. 4 is a schematic block diagram illustrating a structure of the receiving end of the digital broadcasting system in the first embodiment.

FIG. 4 is a schematic block diagram illustrating a basic structure of the receiving end of the noninterlace digital broadcasting system according to the first embodiment of the invention, in which the components identical to those in FIG. 1 have the same reference numbers and characters, and description thereof is not repeated here.

Referring to FIG. 4, at the receiving end of the noninterlace digital broadcasting system in the first embodiment of the invention, picture data DATA of one channel transmitted from communication satellite 8 is received by a receiving antenna for satellite broadcasting 9 and demodulated and decoded by a noninterlace system adapted receiver 10, as already described with reference to FIG. 1. According to the invention, noninterlace system adapted receiver 10 is internally provided with an interface function for digitally outputting picture data DATA as it is.

A frame memory unit 21 of the receiving end receives picture data DATA demodulated and decoded by noninterlace system adapted receiver 10, and writes it into two field memories (not shown) of the receiving end.

Specifically, among pixel data constituting picture data DATA, pixel data of the first region (e.g. picture signal R for the right eye if picture data DATA shown in FIGS. 3A to 3C is received) is written into one field memory of the receiving end, and pixel data of the second region (e.g. picture signal L for the left eye) is written into the other.

Field data (the written right eye picture signal R and left eye picture signal L) are respectively read from two field memories of the receiving end at the same timing and half the rate of the writing frequency.

Specifically, the writing frequency is (2×FH) and the reading frequency is FH according to the example presented above.

Figure 5B:
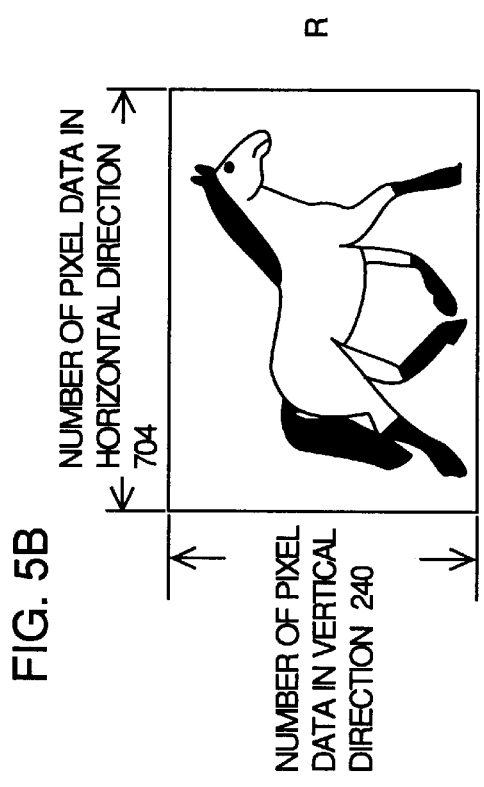
FIGS. 5A to 5C illustrate the processing of a frame memory unit of the receiving end in the first embodiment.
Figure 5C:
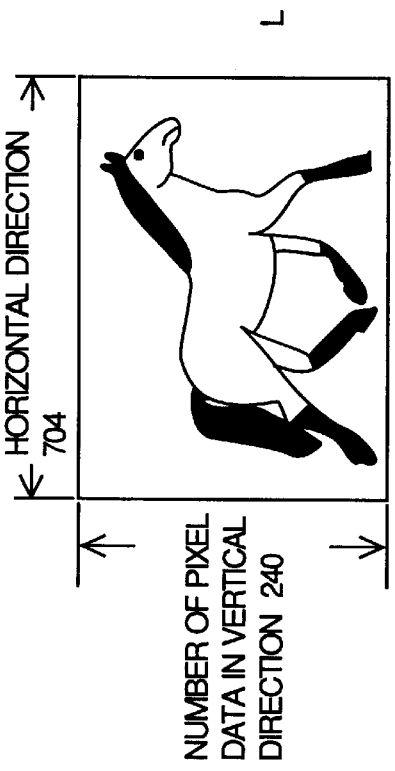
Figure 5A:
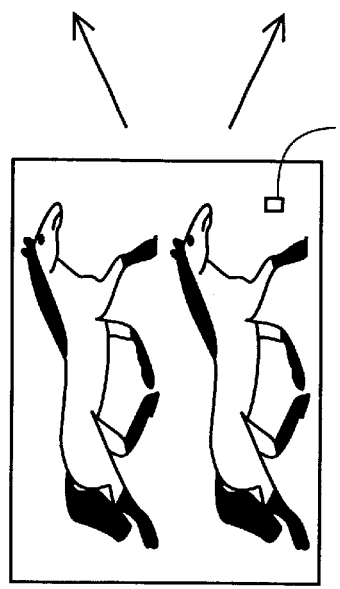

FIGS. 5A to 5C illustrate the processing of frame memory unit 21 of the receiving end in the first embodiment of the invention, with FIG. 5A showing a structure of picture data DATA, FIG. 5B showing a structure of picture signal R for the right eye, and FIG. 5C showing a structure of Rae picture signal L for the left eye.

FIGS. 5A to 5C clearly show that frame memory unit 21 of the receiving end converts picture data DATA transmitted over a single channel transmission line to picture signal R for the right eye and picture signal L for the left eye.

Specifically, frame memory unit 21 of the receiving end converts a noninterlace frame signal of one frame to an interlace field signal format to reproduce picture signals of two fields (right eye picture signal R and left eye picture signal L).

Picture signal R for the right eye and picture signal L for the left eye are then converted to analog signals by a D/A converter (not shown) if necessary, and input to a stereoscopic display monitor 12.

Examples of stereoscopic display monitor 12 are of various types (e.g. the one using eyeglasses of the liquid crystal shutter system, "display screen reproduction system" without using eyeglasses, and the like).

So long as two interlace system cameras 13a and 13b operate in synchronization with each other, both of picture signal R for the right eye and picture signal L for the left eye supplied to stereoscopic display monitor 12 are always picture signals obtained from pictures that are simultaneously taken.

Therefore, when a stereoscopic picture is to be displayed on stereoscopic display monitor 12, a synchronizing process for light eye picture signal R and left eye picture signal L is unnecessary.

The number of effective pixels used for the purpose of description in the first embodiment of the invention is based on the standard value, and any other number of pixels is applicable. Any other values of the horizontal sync frequency and the vertical sync frequency are also applicable.

The compression efficiency would be enhanced if the number of effective pixels is defined as any multiple of integer of the minimum block unit for picture compression (e.g. 8 pixels×8 pixels when the MPEG standard is employed as a compression system).

Second Embodiment

According to the second embodiment of the invention, an effect achieved when the invention is applied to a broadcasting service (except for the stereoscopic broadcasting service) that provides two pictures synchronized with each other is described. It is noted that the noninterlace digital broadcasting system shown in FIG. 1 is used as one example of the digital broadcasting system for the purpose of description, similarly to the first embodiment.

Figure 6:
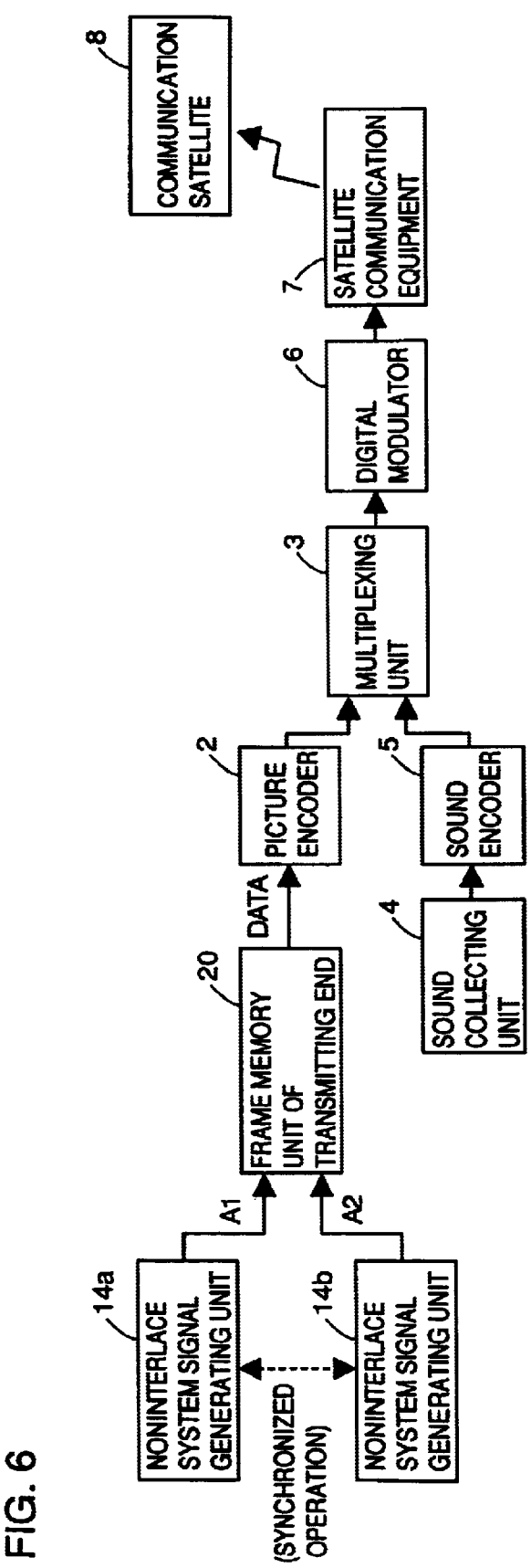
FIG. 6 is a schematic block diagram illustrating a structure of the transmitting end of a digital broadcasting system in the second embodiment.

FIG. 6 is a schematic block diagram illustrating a basic structure of the transmitting end of a noninterlace digital broadcasting system in the second embodiment of the invention, in which the invention is applied to the broadcasting service which provides two pictures synchronized with each other. Those components identical to those of the noninterlace digital broadcasting system already shown in FIG. 1 have the same reference numbers and characters, and description thereof is not repeated here.

A system structure of the transmitting end of the noninterlace digital broadcasting system in the second embodiment of the invention and its operation are first described.

Referring to FIG. 6, the transmitting end of the noninterlace digital broadcasting system in the second embodiment of the invention employs interlace system signal generating units 14a and 14b (e.g. VTR, camera, or the like) as an input device for pictures. Interlace system signal generating units 14a and 14b are synchronously operated to output picture signals. A picture signal A1 is output from interlace system signal generating unit 14a and a picture signal A2 is output from interlace system signal generating unit 14b.

A frame memory unit 20 of the transmitting end receives at its input picture signals A1 and A2 obtained by interlace system signal generating units 14a and 14b respectively.

Frame memory unit 20 of the transmitting end writes picture signal A1 into one of two field memories (not shown) of the transmitting end and writes picture signal A2 into the other field memory, and reads them at twice the rate of the writing frequency, as described in the first embodiment. The order of reading follows the same manner as that described in the first embodiment.

Specifically, frame memory unit 20 of the transmitting end converts interlace field signals of two fields (picture signal A1 and picture signal A2) into a noninterlace frame signal of one frame (picture data DATA).

The noninterlace frame signal of one frame is efficiently compressed by a picture encoder 2 as described in the first embodiment and thereafter processed by circuits of the subsequent stages to be transmitted to a communication satellite 8 over a transmission line of a single channel.

A system structure of the receiving end of the noninterlace digital broadcasting system in the second embodiment of the invention and its operation are next described.

FIG. 7 is a schematic block diagram illustrating a basic structure of the receiving end of the noninterlace digital broadcasting system in the second embodiment of the invention, in which the components identical to those of the digital broadcasting system already shown in FIG. 1 have the same reference numerals and characters and the description thereof is not repeated.

Referring to FIG. 7, at the receiving end of the noninterlace digital broadcasting system in the second embodiment of the invention, picture data DATA of one channel transmitted from communication satellite 8 is received by a receiving antenna for satellite broadcasting 9, and demodulated and decoded by a noninterlace system adapted receiver 10 as already described with reference to FIG. 4.

A frame memory unit 21 of the receiving end receives picture data DATA which is demodulated and decoded by noninterlace system adapted receiver 10, and writes it into two field memories (not shown) of the receiving end as described already in the first embodiment. The frame memory unit then reads field data (written picture signals A1 and A2) from respective two field memories of the receiving end respectively at the same timing and half the rate of the writing frequency.

Frame memory unit 21 of the receiving end thus converts picture data DATA transmitted on a transmission line of a single channel into picture signals A1 and A2.

Specifically, frame memory unit 21 of the receiving end converts a noninterlace frame signal of one frame to an interlace field signal format to reproduce picture signals of two fields (picture signals A1 and A2).

A switching unit 22 receives these picture signals A1 and A2, and switches them to output one of them.

Picture signal A1 or picture signal A2 selected by switching unit 22 is supplied to a display monitor 23.

The switching by switching unit 22 can be done arbitrarily by the user.

Accordingly, in the relay broadcasting of a baseball game, if a picture taken from the backstop side (picture signal A) and a picture taken from the outfield side (picture signal B) are provided to the user using the noninterlace digital broadcasting system of the invention, the user can appropriately select from different pictures that are simultaneously presented, via switching unit 22, any picture (picture signal A1 or picture signal A2) which the user wants to watch.

Therefore, a program selected by the user can be displayed immediately without switching of the channel. Various broadcasting services can thus be provided at a higher speed.

According to the invention, picture signals of two channels obtained from pictures taken according to the interlace system are converted to picture data of one channel to be compressed and transmitted, so that the picture signals of two channels can be transmitted and received efficiently over a transmission line of one channel as described above.

Further, the picture signals of two channels are transmitted and received as the picture data of one channel, so that a synchronizing process for the picture signals of two channels is unnecessary in the monitoring operation.

Both of the transmitting and receiving ends can be implemented with simple facilities and circuit structure similar to those of the conventional digital broadcasting system.

What is claimed is:

1. A digital broadcasting system, comprising:
   picture processing means for multiplexing a field picture signal for the right eye of an interlace system and a field picture signal for the left eye of an interface system synchronized with each other in association with every corresponding even number field and every corresponding odd number field to generate a frame picture signal of one channel of non-interlace system, said picture processing means arranging a picture corresponding said field picture signal for the right eye and a picture corresponding said field picture signal for the left eye respectively into regions formed by vertically dividing a picture corresponding said frame picture signal of one channel;
   transmission means for compressing, modulating and transmitting said frame picture signal;
   reception means for receiving, demodulating and expanding said transmitted frame picture signal; and
   picture signal reproducing means for receiving said demodulated and expanded frame picture signal and reproducing said field picture signal for the right eye and said field picture signal for the left eye.

2. The digital broadcasting system according to claim 1, wherein
   said picture processing means includes field memories for respectively storing said field picture signal for the right eye and said field picture signal for the left eye, and wherein
   said picture processing means writes said field picture signal for the right eye and said field picture signal for the left eye into said field memories simultaneously for every corresponding even number field and for every corresponding odd number field and reads said field picture signal for the right eye and said field picture signal for the left eve from said field memories alternatively at the rate twice as fast as the rate in writing to generate said picture signal of one channel.

\* \* \* \* \*